(12) United States Patent
Takekawa et al.

(10) Patent No.: US 8,971,277 B2
(45) Date of Patent: Mar. 3, 2015

(54) WIRELESS COMMUNICATION SYSTEM AND RECEIVING DEVICE

(71) Applicant: Hitachi Kokusai Electric Inc., Tokyo (JP)

(72) Inventors: Masayuki Takekawa, Tokyo (JP); Keigo Hasegawa, Tokyo (JP); Seishi Sasaki, Tokyo (JP); Keat Beng Toh, Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 107 days.

(21) Appl. No.: 13/738,019

(22) Filed: Jan. 10, 2013

(65) Prior Publication Data

US 2013/0182660 A1    Jul. 18, 2013

(30) Foreign Application Priority Data

Jan. 13, 2012  (JP) .................................. 2012-004985
Mar. 6, 2012   (WO) .................. PCT/JP2012/055652

(51) Int. Cl.
*H04W 4/00* (2009.01)
*H04W 72/08* (2009.01)
(Continued)

(52) U.S. Cl.
CPC ........... *H04W 72/082* (2013.01); *H04L 5/0044* (2013.01); *H04L 5/0053* (2013.01); *H04L 5/006* (2013.01); *H04L 5/1469* (2013.01); *H04L 27/0006* (2013.01)
USPC ...................................................... 370/329

(58) Field of Classification Search
CPC .................................................. H04W 72/082
USPC ............................................................ 370/329
See application file for complete search history.

(56) References Cited

U.S. PATENT DOCUMENTS 8,131,304 B2 *  3/2012  Chaudhri et al. .............. 455/450
8,290,503 B2 * 10/2012  Sadek et al. ................ 455/452.1
(Continued)

FOREIGN PATENT DOCUMENTS

JP  2006-287357   10/2006
JP  2007-189636    7/2007
(Continued)

OTHER PUBLICATIONS

Fujji, Koji, "Cognitive radio: Core technology of using white space to eliminate the waste of wave use", [online], RIC TELECOM, [retrieved on Jun. 9, 2011], retrieved from http//businessnetwork.jp/tabid/65/artid/110/page/1/Defaultaspx, (with English translation).
(Continued)

*Primary Examiner* — Mark Rinehart
*Assistant Examiner* — Maharishi Khirodhar
(74) *Attorney, Agent, or Firm* — Harness, Dickey & Pierce, P.L.C.

(57) ABSTRACT

In a wireless communication system for performing wireless communication using a white space, a receiving station includes an interference suppression processing part which performs processing to reduce interference which is received by the signal transmitted from a transmitting station at a frequency of the white space, a receiving quality estimation part which estimates communication quality of the communication using the frequency of the white space based on the signal processed by the interference suppression processing part, and a receiving quality informing part which transmits to the transmitting station the communication quality information estimated by the receiving quality estimation part.

5 Claims, 6 Drawing Sheets

(51) Int. Cl.
*H04L 5/00* (2006.01)
*H04L 5/14* (2006.01)
*H04L 27/00* (2006.01)

(56) References Cited

U.S. PATENT DOCUMENTS

| | | | |
|---|---|---|---|
| 8,737,922 B2* | 5/2014 | Irnich et al. | 455/63.1 |
| 2007/0167160 A1 | 7/2007 | Asanuma et al. | |
| 2008/0261607 A1 | 10/2008 | Craig | |
| 2010/0197317 A1 | 8/2010 | Sadek et al. | |
| 2010/0279680 A1* | 11/2010 | Reudink | 455/424 |
| 2011/0136499 A1 | 6/2011 | Miyata | |

FOREIGN PATENT DOCUMENTS

| | | |
|---|---|---|
| JP | 2008/539650 | 11/2008 |
| JP | 2010-034908 | 2/2010 |
| JP | 2010-183224 | 8/2010 |
| WO | WO 2010/088586 | 8/2010 |

OTHER PUBLICATIONS

IEEE Standards Association, "Part 22: Cognitive Wireless RAN Medium Access Control (MAC) and Physical Layer (PHY) Specifications: Policies and Procedures for Operation in the TV Bands", IEEE Std 802.22-2011, Institute of Electrical and Electronics Engineers, Inc., New York, NY, Jul. 1, 2011.

Office Action dated Jan. 15, 2013 issued in corresponding Japanese Patent Application No. 2012-004985 with brief English translation (three pages).

* cited by examiner

P : PREAMBLE, FRAME HEADER
C : CONTROL INFORMATION

P : PREAMBLE, FRAME HEADER
C : CONTROL INFORMATION

US 8,971,277 B2

WIRELESS COMMUNICATION SYSTEM AND RECEIVING DEVICE

INCORPORATION BY REFERENCE

The present application claims priority from Japanese application No. JP2012-004985 filed on Jan. 13, 2012 and PCT application No. PCT/JP2012/055652 filed on Mar. 6, 2012, the content of which is hereby incorporated by reference into this application.

BACKGROUND OF THE INVENTION

The present invention relates to a wireless communication system using a white space, and more particularly to a technology for assigning a frequency to be used.

Progress of an information society in recent years is very remarkable, and as a communication method for many information and communications apparatus and services, wireless communication is also used frequently other than wire communication. Therefore, the demands for the radio frequencies whose use is limited are increasing continuously, and the depletion of frequencies that can be allocated is posing a big problem in every country in the world. In general, a country performs license management of the frequencies, and only those who are licensed to use can use the frequencies in the specific location and time period. But, in order to satisfy the demands for frequencies which will increase continuously in the future, a new method of using the frequencies not being obsessed with the incumbent use method is being demanded.

Therefore, as a new method of using the frequencies to solve the depletion problem of the frequencies, studies are being made in these years to provide a method using a frequency band (white space) which is not used spatially and timewise though it has already been allocated. For example, research and development are being performed on a cognitive wireless communication system or the like by which an unlicensed user (hereinafter referred to as "secondary user") uses the radio wave of the white space flexibly while the influence of the incumbent system for a licensed user (hereinafter referred to as "primary user") to the frequency use is avoided sufficiently (See Non Patent Literature 1).

For example, in a wide-area wireless communication (WRAN: Wireless Regional Area Network) system using the white space, that is standardized by IEEE 802.22, respective radio stations access the database on an IP network to obtain a transmittable frequency list based on the position information on a local station and maximum transmittable power. The transmittable frequency list is collectively managed while it is being updated as required by a spectrum manager (SM) within a base station (BS) to which a terminal (CPE: Customer Premises Equipment) such as a slave station, cellular phone or the like, which is installed from door to door, is connected. And, the BS decides as a use frequency the frequency usable for two-way communication between the BS and the CPE based on the transmittable frequency list.

The respective radio stations (such as BS and CPE, the same applies below) are provided with a spectrum sensing function. Upon detecting by the spectrum sensing that the decided use frequency is being used by the incumbent system (system for the primary user), the respective radio stations notify the information to the SM. Then, the SM excludes the above frequency from the transmittable frequency list. The wireless communication system using the white space performs dynamic spectrum access based on the information which is updated every moment as described above, avoids an influence to the frequency use by the primary user and also realizes communication of the secondary user.

IEEE 802.22 defines time division duplex (TDD) only as the duplex operation system. The BS and the CPE use the same frequency at the time of data transmission according to the TDD, but realizes two-way communication by performing communication with a different transmission timing. However, the duplex operation system according to the TDD only uses the same frequency as the two-way communication. Therefore, for the wireless communication system using the white space involving a case where a transmittable frequency is different for the respective radio stations or a case where transmittable maximum transmission power is different, it is hard to say that the TDD is an efficient communication method. For example, in a case where one radio station can transmit with a high power at a certain frequency but the other radio station can transmit with a low power only at the same frequency, communication quality in two ways becomes asymmetrical. Therefore, when such a frequency is allocated, the communication cannot be performed efficiently.

There is also a case where transmitting and receiving in opposite directions can be performed even if one radio station can perform data transmission at a certain frequency but the other radio station cannot receive at that frequency. In such a case, it becomes a unidirectional link by which transmitting and receiving can be performed one way only, but such a frequency cannot be used as a matter of course by the TDD of IEEE 802.22.

Examples of prior art documents of the present invention are as follows.

Non Patent Literature 1: Koji Fujii, "Cognitive radio: Core technology of using white space to eliminate the waste of wave use", [online], RIC TELECOM, [Retrieved on Jun. 9, 2011], Internet Non Patent Literature 2: "IEEE Std 802.22-2011 Part 22: Cognitive Wireless RAN Medium Access Control (MAC) and Physical Layer (PHY) Specifications: Policies and Procedures for Operation in the TV Bands", edited by Institute of Electrical and Electronics Engineers (IEEE) Computer Society, (U.S.A.), IEEE Standards Association, Jul. 27, 2011

SUMMARY OF THE INVENTION

As described above, since IEEE 802.22 defines the TDD only as a duplex operation system, communications via a unidirectional link is exempt from the requirements of the IEEE 802.22. However, it may be better to use a frequency that becomes one-way link in view of the efficient use of frequency resource.

Here, it is general that the BS is often provided with an antenna at a high place such as a steel tower, a building rooftop or the like, but the CPE is often provided with an antenna at a low position on the ground such as a low-storied building. The CPE is often provided with a directional antenna which is directed toward the BS position, but an omni-directional antenna is often adopted for the BS antenna. Therefore, when the BS and the CPE transmit a signal with the same transmission power, there is assumed a case where the downlink signal transmitted by the BS overreaches to cause interference to the primary user even if an uplink signal transmitted by the CPE does not become interference to the primary user present at a geographically separated position, so that there is a possibility that the transmission power limit becomes a severe value for the BS.

In addition, for example, when digital terrestrial TV broadcasting that is a primary system assumed by the IEEE 802.22 is considered, there are many cases that a required electric field intensity is high because the TV broadcasting uses a high-order modulation method, and the TV broadcasting area has a radius larger than that of the service area of the IEEE 802.22 WRAN system. Therefore, even outside of the TV broadcasting area, there is a high possibility that the TV broadcasting signal having strength enough to deteriorate a signal-to-interference power ratio (SIR) of the WRAN system is present within the WRAN service area.

Under the circumstances described above, the present invention relates to a wireless communication system using a white space and aims to enable efficient frequency allocation by using the IEEE 802.22 TDD system as it is by using as a two-way link in the above-described situation, namely at a frequency that can be used by only a one-way link because the receiving quality of the downlink signal mainly becomes low SIR because of the limit of the downlink transmission power of the BS and the signal of the primary system.

According to the IEEE 802.22, to decide the frequency to be used, it is made possible to use an index which influences on the communication quality such as an occupation pattern and interference power of the frequency of the incumbent system of the primary user. However, it is determined that what kind of index is used and how are outside of the range of the provisions of IEEE 802.22.

To solve the above problem, (1) an aspect of the invention provides a wireless communication system including a transmitting station and a receiving station to perform wireless communication mutually, and performing the wireless communication using a white space, wherein the receiving station includes a signal receiving part which receives a signal transmitted from the transmitting station at a first frequency of the white space; an interference suppression part which performs processing to reduce the interference received by the signal received by the signal receiving part; a communication quality estimation part which estimates communication quality of the communication using the first frequency based on the signal processed by the interference suppression part; and a communication quality information transmitting part which transmits to the transmitting station the communication quality information estimated by the communication quality estimation part; and the transmitting station includes a communication quality information receiving part which receives the communication quality information from the receiving station; a frequency allocation processing part which allocates the first frequency based on the communication quality information received by the communication quality information receiving part as a frequency at the time when a control signal is transmitted to the receiving station; and an allocated result transmitting part which transmits to the receiving station the result of allocation by the frequency allocation processing part.

(2) According to the above aspect of the invention, the communication quality estimation part estimates communication quality of each of the case in which the reduction processing is performed on the signal received at the first frequency by the interference suppression part and the case in which the reduction processing by the interference suppression part is not performed, and obtains finally the communication quality having high quality between the respective estimated communication quality; and the frequency allocation processing part decides a frequency at which data transmission can be performed on the basis of the communication quality information received from the receiving station, and allocates the decided frequency as a frequency at the time of the data transmission to the receiving station.

(3) According to the above aspect of the invention, the transmitting station performs the wireless communication with one or plural of the receiving stations by an OFDMA (Orthogonal Frequency-Division Multiple Access) system; the control information is modulated by a modulation method having a low required SINR in comparison with transmission of data from the transmitting station to the receiving station; and the frequency allocation processing part, when it is judged that the communication quality information received from the receiving station shows that there is interference at the first frequency and the control signal only can be received, allocates a frequency used at the time of transmission of the control signal to the receiving station to the first frequency and allocates the frequency used at the time of the data transmission to a second frequency different from the first frequency.

(4) According to the above aspect of the invention, the transmitting station performs the wireless communication with the plurality of receiving stations by the OFDMA system; the transmitting station includes a signal transmitting part which simultaneously transmits the control signal and the data at a plurality of frequencies allocated by the frequency allocation processing part; the frequency allocation processing part judges for each of the plurality of receiving stations that the communication quality indicated by the communication quality information is quality withstanding data communication performed by a high-order modulation method and decides the first frequency as a frequency at which data can be transmitted from the transmitting station, and judges that the communication quality indicated by the communication quality information is quality nonwithstanding the data communication performed by the high-order modulation method and decides the second frequency other than the first frequency as a frequency at which data can be transmitted; and the transmitting station transmits simultaneously the control signal and the data at the first frequency allocated by the frequency allocation processing part and the second frequency.

(5) An aspect of the invention provides a receiving device of a receiving station for performing wireless communication with a transmitting station in a wireless communication system for performing wireless communication using a white space, including a signal receiving part for receiving a signal transmitted from the transmitting station at a first frequency of the white space; an interference suppression part for performing processing to reduce the interference received by the signal received by the signal receiving part; a communication quality estimation part for estimating communication quality of the communication using the first frequency based on the signal processed by the interference suppression part; and a communication quality information transmitting part for transmitting to the transmitting station the communication quality information estimated by the communication quality estimation part, and the first frequency is allocated based on the communication quality information from the receiving station as a frequency at the time of transmission of a control signal to the receiving station by the transmitting station to perform wireless communication with the transmitting station.

According to the aspect (1) of the invention, the interfering signal when the white space is used is suppressed and the receiving quality can be improved, so that even if the downlink signal at the first frequency of the white space falls in a low SIR environment, the downlink control signal can be received at the above first frequency. Therefore, according to the aspect (1) of the invention, the use of the uplink at the first frequency becomes possible while keeping the TDD system, and the effective use of the frequency of the whole system becomes feasible.

According to the aspect (2) of the invention, the frequency at the time of data transmission can be allocated on the basis of the communication quality information for properly evaluating the quality at the time of the data communication.

According to the aspect (3) of the invention, in the wireless communication system where the transmitting station performs the wireless communication with one or plural of the receiving stations by the OFDMA system and the control information is modulated by the modulation method having the required SINR which is lower in comparison with the transmission of data from the transmitting station to the receiving station, it becomes possible to allocate the first frequency of the white space for transmitting the control signal or the second frequency other than the first frequency as the frequency for the data transmission.

According to the aspect (4) of the invention, it can be applied to the wireless communication system where the transmitting station performs the wireless communication with the plurality of receiving stations by the OFDMA system, and the transmitting station includes the signal transmitting part which simultaneously transmits the control signal and the data at the plurality of frequencies allocated by the frequency allocation processing part; and the data communication can be performed by using the white space of communication performed by using the high-order modulation method for TV broadcasting and the like.

According to the aspect (5) of the invention, the interfering signal when the white space is used is suppressed and the receiving quality can be improved, so that even if the downlink signal at the first frequency of the white space falls in a low SIR environment, the downlink control signal can be received at the above first frequency. Therefore, the aspect (5) of the invention enables to use the uplink at the above first frequency while keeping the TDD system, and the effective use of the frequency of the whole system becomes feasible.

Other objects, features, and advantages of the present invention will become apparent from the following description of embodiments of the present invention provided in relation to the accompanying drawings.

DESCRIPTION OF THE EMBODIMENTS

Figure 1:
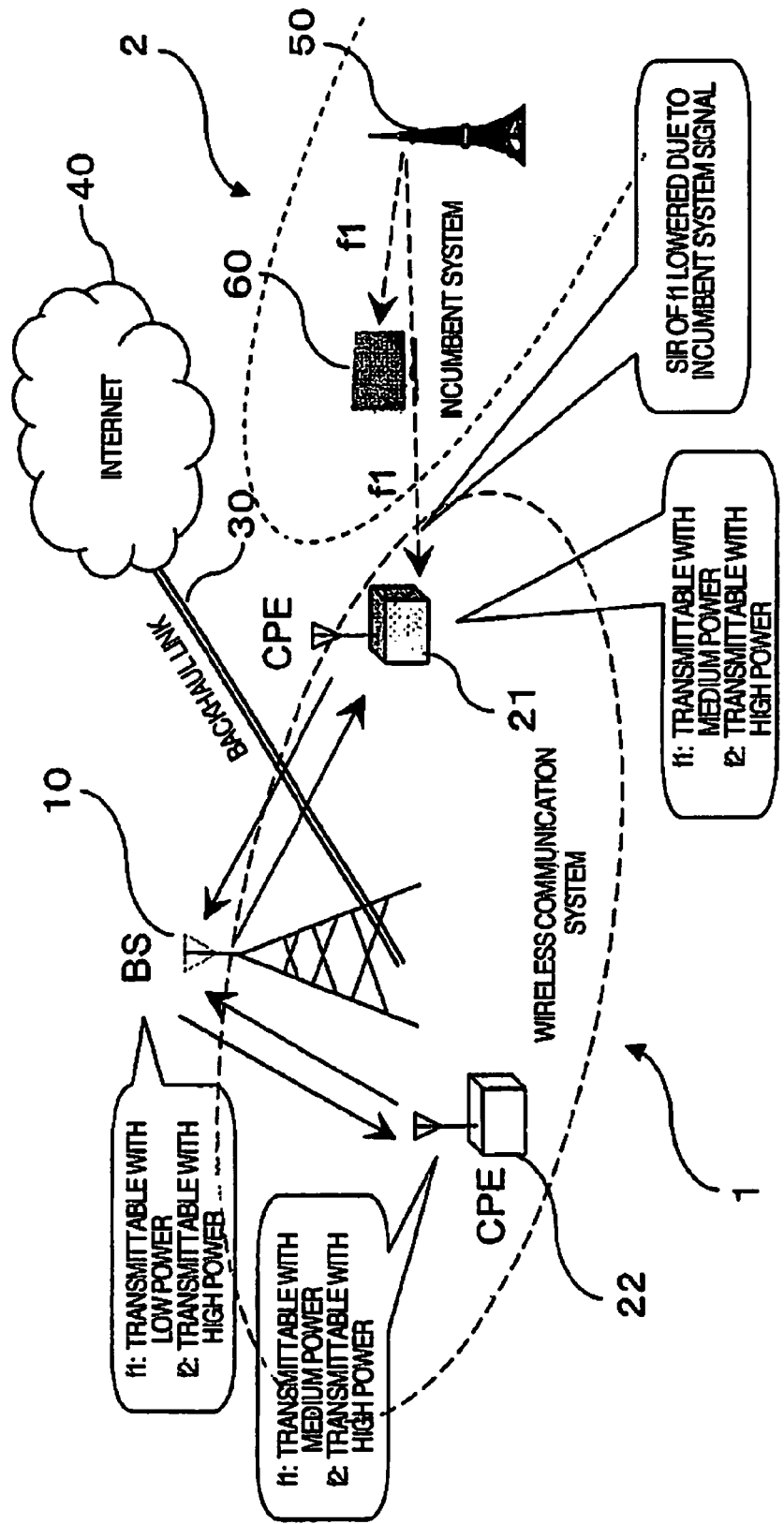
FIG. 1 is a diagram showing an example of the whole structure of a wireless communication system according to the embodiment.

Embodiments of the present invention are described below with reference to the drawings.
(Overview of Wireless Communication System)
FIG. 1 is a diagram showing an example of the whole structure of a wireless communication system according to the embodiment. A wireless communication system 1 of the embodiment is a wireless communication system (white space use system, secondary use system) using a white space.

As shown in FIG. 1, the wireless communication system 1 includes CPEs 21 and 22 which are wireless communication terminals (subscriber station devices) such as slave stations, cellular phones, etc. installed from door to door, a BS 10 which is a base station to which such wireless communication terminals are connected, a backhaul link 30 of the BS 10, and Internet 40.

A communication system 2 shown in FIG. 1 is a broadcasting or communication system (primary system, hereinafter referred to as "incumbent system") of a primary user who is licensed to use a frequency from a country. This incumbent system 2 includes a transmitting station 50 and a receiving station 60. The primary user of the incumbent system 2 includes been licensed for a frequency f1 from the country. It is assumed in the following description that a secondary user who is not licensed to use the frequency f1 from the country uses the frequency f1 as the white space in the wireless communication system 1.

As shown in FIG. 1, the wireless communication system 1 is geographically positioned close to the incumbent system 2. But, when the service area of the wireless communication system 1 is located with an appropriate distance away from the service area of the incumbent system 2, and the transmission power of the radio station configuring the wireless communication system 1 is lowered sufficiently, the wireless communication system 1 can communicate without interfering with the incumbent system 2 even if transmission is performed by using the frequency f1.

However, the antenna of the BS 10 is an omni-directional antenna which is set up at a high position and the antenna of the CPE 22 is a directional antenna which is set up at a low position. In the geographical arrangement of FIG. 1, if the transmission power of the BS is not made smaller than the transmission power of the CPE, interference is caused to the incumbent system 2, so that it is determined that the CPE can transmit with medium power, and the BS can transmit with low power.

Figure 2:
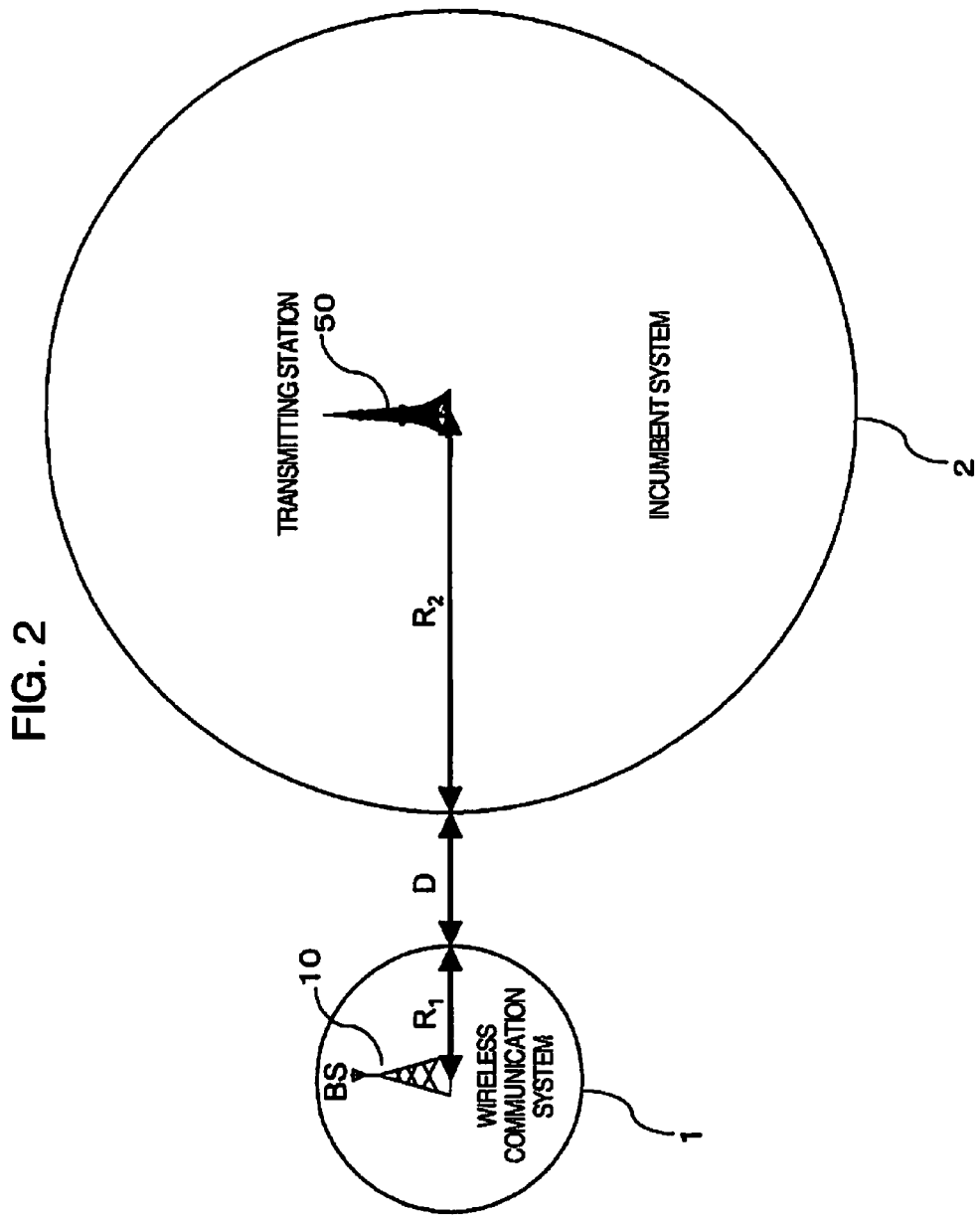
FIG. 2 is a diagram used to illustrate a comparison between a service area radius $R_2$ of a conventional system and a service area radius $R_1$ of the wireless communication system.

At this time, as exemplified in FIG. 2, in a case where service area radius $R_2$ of the incumbent system 2 is much larger than the service area radius $R_1$ of the wireless communication system 1, when an offset distance between the both service areas is determined to be D [m], the signal of the incumbent system 2 is present with high strength in the service area of the wireless communication system 1 in view of the relation shown the following example.
(Example)
In the case where $R_2=5\times R_1$,
then, $D=R_1$,
and the shortest distance $D_{21}$ between CPE, which is at an area end of the wireless communication system 1, and the transmitting station of the incumbent system 2 is:
$D_{21}=R_2+D=5\times R_1+R_1=6\times R_1=1.2\times R_2$, and becomes:
1.2 times the distance $R_2$ from the transmitting station at an area end of the incumbent system 2.

On the other hand, the shortest distance $D_{12}$ between the receiving station, which is at an area end of the incumbent system 2, and the base station of the wireless communication system 1 is:
$D_{12}=R_1+D=R_1+R_1=2\times R_1$, and becomes:
two times the distance $R_1$ from the BS at an area end of the wireless communication system 1.

Generally, a radio wave propagation loss in association with the wireless communication is often modeled to be proportional to the N-th power (N is an integer or real number) of the distance between a transmitting antenna and a receiving antenna (N-th power rule of the distance, N=2 in free-space transmission). That is to say, even if a sufficient offset distance is kept between the areas of the both systems so that the signal of the wireless communication system 1 does not interfere with the incumbent system 2, the signal of the incumbent system 2 having a service area larger than the wireless communication system 1 reaches while keeping high strength into the service area of the wireless communication system 1.

As to the frequency f2, since there is no incumbent system using the frequency f2 around the wireless communication system 1, all radio stations of the wireless communication system 1 can transmit with high power.

In this embodiment, the wireless communication system 1 using the white space can use effectively the geographically sable frequency resources even if the signal of the incumbent system 2 reaches while keeping high strength into the service area of the wireless communication system 1.

(Example of TDD Frame Allocation Pattern)

A concept of TDD frame allocation at the BS 10 of this example is described below with reference to FIGS. 3A and 3B. The wireless communication system 1 of this example complies with IEEE 802.22 and uses OFDMA (Orthogonal Frequency-Division Multiple Access) as an access method. The TDD frame comprises a downlink subframe and an uplink subframe with a variable TDD ratio. And, a data signal to the respective CPEs in the downlink subframe and a data signal from the respective CPEs in the uplink frame are arranged in a two-dimensional area of frequency and time in a unit called as burst. Control information including MAP information or the like for instructing the arrangement of the burst (data burst) from the BS 10 to the respective CPEs is arranged near the head of the downlink subframe. Actually, the control information is composed of plural control bursts, which are modulated by a modulation method (for example, control information of QPSK with respect to data burst of 16 QAM) having a low required SINR in comparison with the data burst.

Figure 3A:
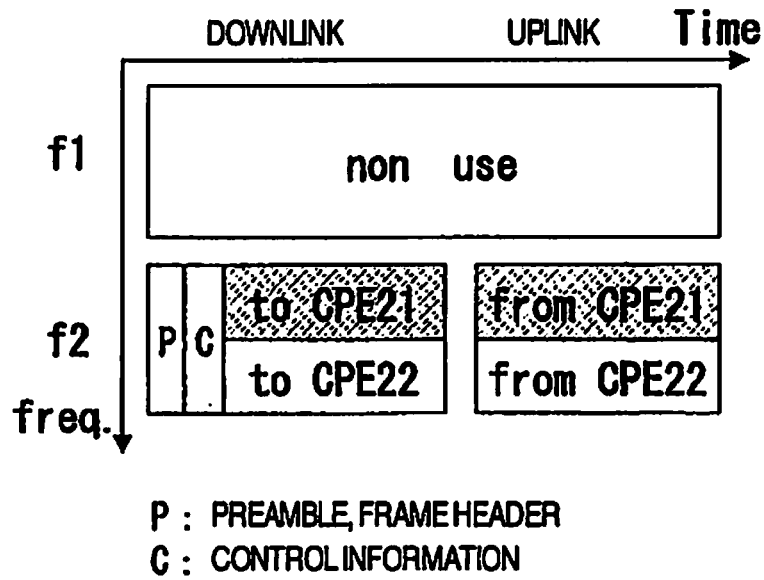
FIGS. 3A and 3B are diagrams showing examples of allocation patterns of a TDD frame.
Figure 3B:
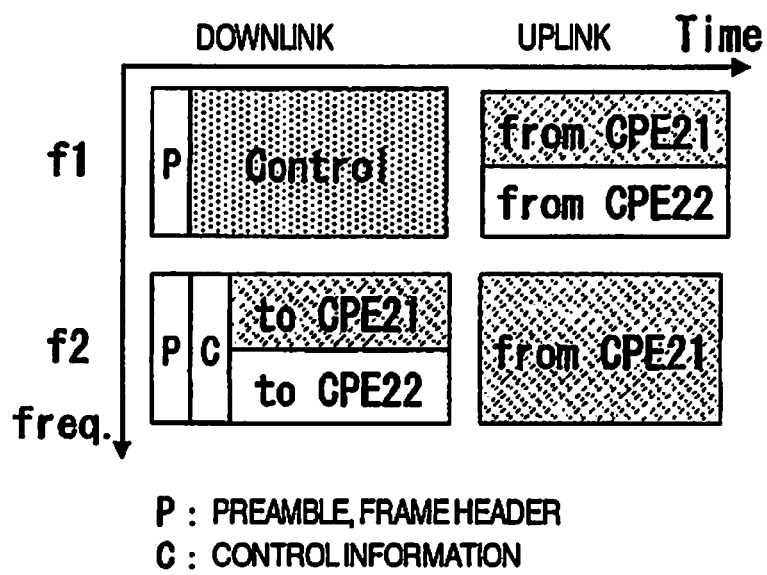

FIG. 3A shows an example of a conventional basic pattern, and FIG. 3B shows an example of improvement pattern according to the embodiment. In FIGS. 3A and 3B, a situation in which the downlink is strongly influenced at the frequency f1 is also assumed as described with reference to FIG. 1. In FIG. 3A, the frequency f1 is not used because the downlink signal to the CPE 21 becomes a low SIR at the frequency f1, resulting in a unidirectional link.

On the other hand, control information only is arranged in the downlink subframe of the frequency f1 in FIG. 3B. The CPE 21 and the CPE 22 can receive (decode) a control signal by an interference canceller or the like even at the frequency f1 and can transmit through a directional antenna or the like while suppressing the interference of the incumbent system. The frequency f2 can be basically used similar to FIG. 3A. Particularly, since the frequency f1 and the frequency f2 are used for the uplink burst transmission, there can be expected effects that the number of bursts to be packed into the uplink subframe of the frequency f2 can be decreased, the overhead of control information to be transmitted by the downlink subframe of the frequency f2 can be reduced, and the whole throughput can be optimized because choices for the arrangement of the subframe increase.

[First Embodiment]

Figure 4:
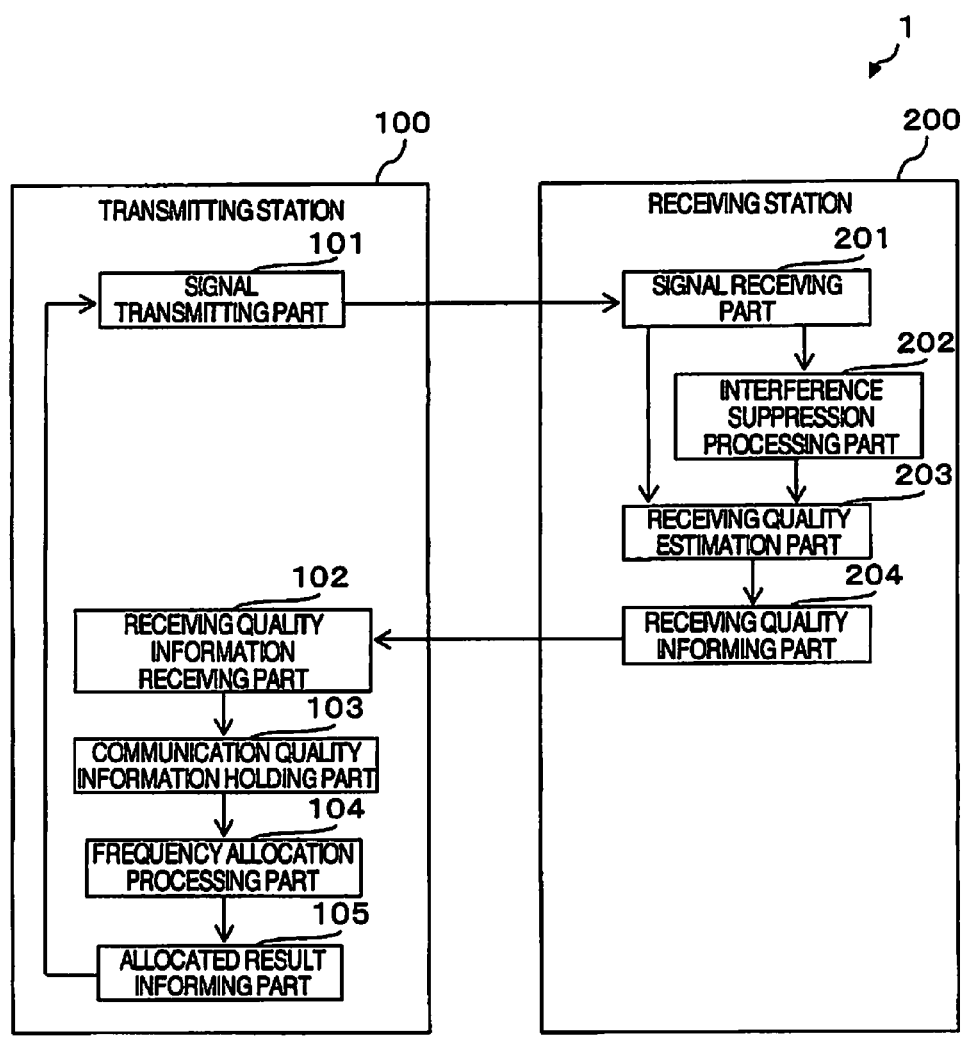
FIG. 4 is a block diagram showing structure examples of a transmitting station and a receiving station of the wireless communication system according to the embodiment.

FIG. 4 is a block diagram showing a structure example of a transmitting station 100 and a receiving station 200 of the wireless communication system 1 according to this embodiment.

As shown in FIG. 4, the wireless communication system 1 includes the transmitting station 100 which transmits data by wireless communication, and the receiving station 200 which receives data transmitted from the transmitting station 100. In this embodiment, the transmitting station 100 corresponds to the BS 10 of FIG. 1, and the receiving station 200 corresponds to the CPE 21 and the CPE 22 of FIG. 1. The receiving station 200 may be one but may also be plural as shown in FIG. 1. It is also determined that the frequency usable as the white space includes at least two frequencies (channels) f1 and f2.

The transmitting station 100 and the receiving station 200 are described below for their structures with reference to FIG. 4.

(Structure of the Receiving Station 200)

The receiving station (receiving device or communication device of the receiving station) 200 is provided with a signal receiving part 201, an interference suppression processing part 202, a receiving quality estimation part 203, and a receiving quality informing part 204.

The signal receiving part 201 receives a signal at the particular frequency f1 (and f2) transmitted from the transmitting station 100. The signal received by the signal receiving part 201 in this embodiment is a downlink signal transmitted from the BS 10 to the CPE 21 and the CPE 22. The signal received by the signal receiving part 201 is given to the interference suppression processing part 202 and the receiving quality estimation part 203. Here, the particular frequency f1 is (one of) frequencies being transmitted by the transmitting station 200, which were found during the initial operation (synchronization establishment) of the receiving station 200 or in a process of spectrum sensing or the like.

The interference suppression processing part 202 performs processing for SIR improvement by suppressing (reducing) the signal which interferes with the signal received by the signal receiving part 201. And, the SIR-improved signal is given to the receiving quality estimation part 203 by the interference suppression processing part 202. At this time, the SIR improvement method of the interference suppression processing part 202 may be interference suppression techniques according to signal processing such as cumulative addition of a signal of a preamble or the like repeatedly transmitted or spatial interference suppression techniques according to multi-antenna signal processing.

The receiving quality estimation part 203 uses the signals given from the signal receiving part 201 and the interference suppression processing part 202 to detect whether or not data can be received at the particular frequency f1. According to this embodiment, the receiving quality estimation part 203 estimates the receiving quality of cases in which interference suppression is applied and not applied when data is received at the particular frequency f1, and selects one with better quality.

Specifically, the receiving quality estimation part 203 judges the receiving quality as follows. Specifically, the received signal is demodulated/decoded, and when an error is not detected by an error detection code such as a CRC (Cyclic Redundancy Check) code, it may be determined to be the receiving quality which can be received, and when a known signal such as a pilot signal contained in each signal is used to estimate the SINR and when the SINR is not lower than a threshold value, it may be determined to be the receiving quality which can be received. And, the estimated result of the SINR or a history of a bit error rate may also be kept for a predetermined period to judge from its average value whether reception can be made. In addition, plural threshold values may be set, and the respective threshold values may be determined as an index of the communication quality, and the maximum transmission rate with which communication can be made is led referring to a table which is previously stored, and it may be determined to be communication quality.

Generally, the signals from the BS, which are first received by the CPE, are broadcast control signals such as a preamble, a control burst and the like, but not limited to the receiving quality estimation performed based on such signals. That is to say, it may be estimation based on the reception of a test signal dedicated for the receiving quality estimation, may be the receiving quality estimation based on the reception of the control signal of a beacon or the like or a broadcast data signal, or may be the receiving quality estimation based on the interception of a unicast data signal which is to another station.

The receiving station 200, when it is judged that the control signal transmitted by the transmitting station 100 can be received by the above procedure, starts sequentially the network entry to the transmitting station 100 (namely, BS), and establishes a communication channel to the transmitting station 100 while keeping the frequency f1.

The receiving quality informing part 204 notifies the receiving quality information to the transmitting station 100 through the communication channel. At this time, when it is judged on the side of the transmitting station 100 that the downlink quality is good (the receiving station 200 can receive data), not only uplink but also downlink data communication can be performed at the frequency f1, and when it is judged on the side of the transmitting station 100 that the downlink quality is a medium degree (the receiving station 200 can receive only a control signal (though being interfered)), uplink data communication is performed at the frequency f1, and downlink data communication is performed at a different frequency (e.g., f2). Here, the receiving quality information may be notified, for example, as a CBP (Coexistence Beacon Protocol) burst.

(Structure of the Transmitting Station 100)

As shown in FIG. 4, the transmitting station (transmission device or communication device of the transmitting station) 100 is provided with a signal transmitting part 101, a receiving quality information receiving part 102, a communication quality information holding part 103, a frequency allocation processing part 104, and an allocated result informing part 105.

The receiving quality receiving part 102 receives the receiving quality information transmitted from the receiving station 200. As described above, the receiving quality information in this embodiment is communication quality with which the receiving station 200 receives a downlink signal. As to the uplink quality, it is usual to hold by the transmitting station 100 as the receiving quality when the transmitting station 100 receives the receiving quality information.

The communication quality information holding part 103 receives and holds the receiving quality information transmitted from the receiving station 200. Specifically, the communication quality information holding part 103 associates, for example, identifiers (Device ID) for identifying plural receiving stations 200 and receiving quality information, and stores and holds in a form of database or the like into a storage device such as a hard disk of the local station. And, the receiving quality information may be held in association with information on the frequency at which the communication quality was judged.

The frequency allocation processing part 104 refers to the receiving quality information held by the communication quality information holding part 103 to decide frequencies at which the downlink control signal can be transmitted and data can be transmitted, and allocates them as frequencies at the time of control signal transmission and data transmission to the receiving station 200. For example, when the frequency allocation processing part 104 refers to the receiving quality information and judges that the receiving station 200 can receive the control signal, and when it is judged that the receiving quality of the receiving station 200 at the frequency f1 is quality that withstands data communication using a high-order modulation method (modulation method with high required SINR), it is decided that downlink data is also transmitted at f1, and if it is judged that it does not withstand the data communication using the high-order modulation method, the downlink control signal only is transmitted to the receiving station 200 at f1, and it is decided to perform the downlink data transmission at another frequency (for example, f2) with better quality. If a frequency other than f1 is used well at that time, it can be determined to be f2, but if not used, it is selected from candidate frequencies or backup frequencies (channels). Such judgment and allocation are respectively performed on the plural receiving stations 200. That is to say, downlink data toward some receiving stations 200 may be arranged in the downlink subframe of f1, and downlink data toward the remaining receiving stations 200 may be arranged in the downlink subframe of f2. Thus, data communication is allocated with priority to a frequency with better uplink quality and downlink quality for an uplink direction and a downlink direction respectively.

The allocated result informing part 105 transmits the allocated result by the frequency allocation processing part 104 to the receiving station 200 via the signal transmitting part 101. The allocated result is transmitted by, for example, the control information, the super frame control header (SCH) or the like. If there is a receiving station responding a receiving quality information showing downlink quality which is worse than the quality which cannot withstand the data communication at the frequency f1 using the high-order modulation method or a receiving station not responding the receiving quality information, or if most of the receiving stations are not good in both uplink quality and downlink quality, f1 has a high possibility of being interfered with or interfering with the incumbent system or the like, or the efficient use of f1 is difficult, so that it is desirable to stop using the f1.

(Specific Structure of BS 10 (Transmitting Station 100))

A more specific structure of the BS 10 is described below with reference to FIG. 5. In this embodiment, the BS 10 corresponds to the above-described transmitting station 100.

Figure 5:
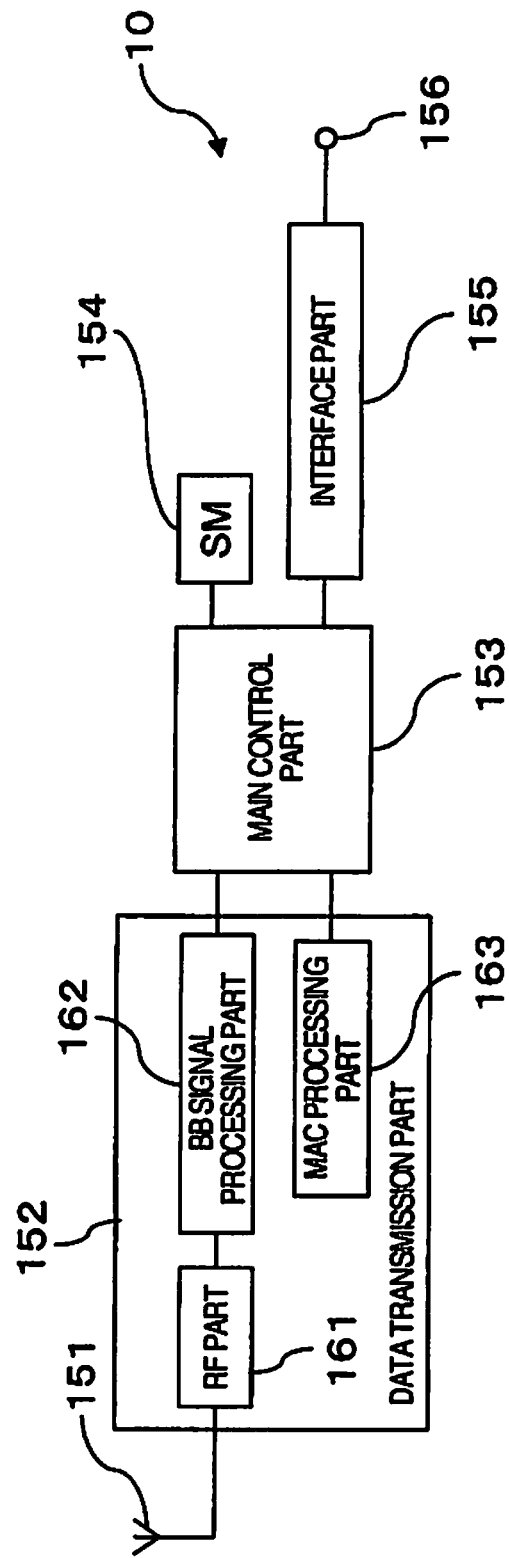
FIG. 5 is a diagram showing a more specific structure example of the BS.

As shown in FIG. 5, the BS 10 is provided with an antenna 151 for transmitting and receiving radio waves, a data transmission part 152 for transmitting and receiving a radio signal (including data, control information, etc.), a main control part 153 for controlling the whole local station, a spectrum manager (SM) 154 for managing the frequency usable by the CPE 21 and the CPE 22, an interface part 155 which is an interface with the backhaul link 30 and an external device, and a terminal 156 for connection with the backhaul link 30 and the external device.

The SM 154 is provided with the above-described communication quality information holding part 103 and the frequency allocation processing part 104. That is to say, the SM 154 holds communication quality information on the each receiving station 200, and if there is a request for frequency allocation from the receiving station 200, frequency allocation processing is performed.

The data transmission part 152 is provided with an RF part 161, a base band (BB) signal processing part 162, and a MAC processing part 163.

The RF part 161 performs processing such as frequency conversion from a base band to a radio frequency band, frequency conversion from the radio frequency band to the base band, signal amplification and the like.

The BB signal processing part 162 performs error correction coding, decode processing, and modulation/demodulation processing. The data transmission part 152 has an FFT size variable structure or a multi radio structure so that the OFDM signal can be transmitted and received at plural frequencies (channels) at the same time.

The MAC processing part 163 performs processing such as control of a frequency channel and data transmitting and receiving timing used by the local station, addition of the local station identifier to a packet, and recognition of a wireless device which is a data transmission source.

Functions of the above-described signal transmitting part 101, receiving quality information receiving part 102, and allocated result informing part 105 are realized by receiving the receiving quality information or transmitting the allocated result through the antenna 151 and the data transmission part 152 under control by the main control part 153.

The main control part 153 can be configured of, for example, a data storage area and software defined on the processor and the memory. And, the processing in the BB signal processing part 162, the MAC processing part 163, and the SM 154 can be realized for example when the processor of the main control part 153 executes by reading the program stored on the data storage device such as a hard disk onto the memory.

(Specific Structure of CPE 21 and CPE 22 (Receiving Station 200))

More specific structures of the CPE 21 and the CPE 22 are described below with reference to FIG. 6. In this embodiment, the CPE 21 and the CPE 22 correspond to the above-described receiving station 200.

Figure 6:
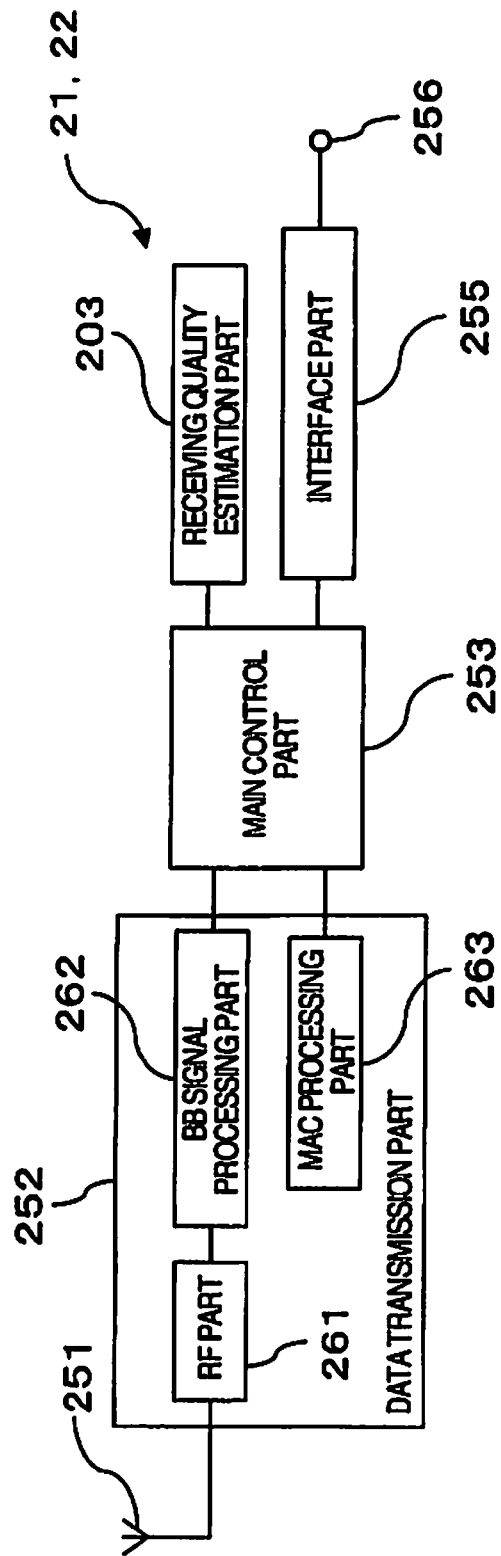
FIG. 6 is a diagram showing a more specific structure example of the CPE.

As shown in FIG. 6, the CPE 21 and the CPE 22 are provided with an antenna 251 for transmitting and receiving radio waves, a data transmission part 252 for transmitting and receiving data, a main control part 253 for controlling the whole local station, a receiving quality estimation part 203 for estimating communication quality at the time when a signal is received from the BS 10, an interface part 255 which becomes interface to an external line and an external device, and a terminal 256 for connecting to an external line and an external device.

The data transmission part 252 is provided with an RF part 261, a base band (BB) signal processing part 262, and a MAC processing part 263.

The RF part 261 performs processing such as frequency conversion from a base band to a radio frequency band and frequency conversion from the radio frequency band to the base band, signal amplification and the like.

The BB signal processing part 262 performs error correction coding, decode processing, and modulation/demodulation processing.

The MAC processing part 263 performs processing such as control of a frequency channel and data transmitting and receiving timing used by the local station, addition of the local station identifier to a packet, and recognition of a wireless device which is a data transmission source.

The functions of the above-described signal receiving part 201, interference suppression processing part 202, receiving quality estimation part 203, and receiving quality receiving quality informing part 204 are realized when the antenna 251 and the data transmission part 252 performs a variety of signal processing or transmitting and receiving of data under control of the main control part 253.

The main control part 253 can also be configured of, for example, a data storage area and software defined on the processor and the memory. And, the processing in the BB signal processing part 262, the MAC processing part 263, and the receiving quality estimation part 203 can be realized for example when the processor of the main control part 253 executes by reading the program stored on the data storage device such as a flash memory onto the memory.

(Effects in the Present Embodiment)

According to this embodiment as described above, in the wireless communication system 1 using the white space, a downlink control signal can be received and it becomes possible to apply the TDD system by applying an interference suppression technique in an environment where the downlink signal has a low SIR.

In addition, receiving quality information (downlink quality) on the respective receiving stations at the respective frequencies are collected, and efficient frequency allocation to the respective two-way communications becomes possible. Specifically, for data communication, a frequency having better uplink quality and downlink quality in each of an uplink direction and a downlink direction is allocated with priority, and even if a frequency does not have good quality, it was determined to use it together if the downlink quality a medium degree (level capable of receiving the control signal) can be secured. Thus, the frequency usage efficiency of the whole system is improved in an environment where quality becomes asymmetric between downlink and uplink.

As a multi-channel system in which the BS 10 transmits at plural frequencies as in the present embodiment, various types can be used, and it is known to use channel bonding, channel aggregation or the like for a physical layer, and multi-channel MAC expansion or the like for the MAC.

(Modification of the Present Embodiment)

In the description of this embodiment, the situation was assumed that the occurrence of interference at a first use (operation) frequency f1 was detected and the operation frequency was changed to f2, but the embodiment can also be applied to a situation in which f2 can be selected from a transmittable frequency list from the beginning, and then the frequency f1 (not included in the list) is also used in response to a band request from the CPE. In such a case, the BS 10 performs transmission at the frequency f1 by outband broadcasting, and the each CPE receives it, and a degree of interference from the incumbent system or the like is estimated by the receiving quality estimation part 203. The receiving quality information can also be notified even at a frequency other than f1 if a communication channel has been established with the BS 10.

The interfered frequency f1 was described as the same as the frequency used by a nearby incumbent system, but since unnecessary radiation from the adjacent frequency might also become an interference source, application refraining from use of the adjacent frequency is also assumed. In such a case, the BS 10 allocates the above-described frequency f1 to the adjacent frequency, and the each CPE can be requested for a response of receiving quality information.

It was described above that communication is performed between BS and CPE, but it is also possible to apply to the chain connection of the BS. In such a case, it shall be deemed that the BS 10 is a master BS, and at least one of the CPE 21 or 22 is a slave BS.

The interfered frequency f1 can also be applied to a direct communication between terminals and a contact with a heterogeneous system. The direct communication between terminals performs transmitting and receiving in the uplink subframe by the respective CPEs according to the burst arrangement designated by the downlink subframes of frequencies f1 and f2. The contact or the like with the heterogeneous system is to share information such as a transmittable frequency and to facilitate finding of a hidden incumbent system, and has usages as an out-of-band broadcast, Rendezvous channel and the like.

Control information or the like which is transmitted at the interfered frequency f1 by the BS 10 can be arranged repeatedly plural times in the downlink subframe, and the SINR can be improved by adding them on the CPE side.

The wireless communication system 1 according to this embodiment is especially suitable for the wireless communication system specified by the IEEE 802.22, but not limited to it. When it is applied to a system in which one base station can perform data transmission to a terminal at one frequency (channel) only, the BS 10 of this embodiment has only to behave as plural base stations having a base station ID for each frequency (namely, corresponding to each of f1 and f2) and installed at the same place.

(Additional Description)

As it is apparent from the above embodiment according to the present invention described in detail, the above-described embodiment can also be partly or wholly described as shown in the following additional description. However, it is to be understood that the following additional description is a mere example of the present invention and the present invention is not limited to it only.

(Additional Description 1)

A wireless communication method includes a transmitting station and a receiving station to perform wireless communication mutually and performs the wireless communication using a white space, comprising:

a first step in which the receiving station receives a signal transmitted from the transmitting station at a first frequency of the white space;

a second step in which the receiving station performs processing to reduce the interference that is received by the signal received in the first step;

a third step in which the receiving station estimates communication quality of the communication using the first frequency based on the signal processed in the second step;

a fourth step in which the receiving station transmits communication quality information estimated in the third step to the transmitting station;

a fifth step in which the transmitting station receives the communication quality information from the receiving station;

a sixth step in which the transmitting station allocates the first frequency as a frequency when a control signal is transmitted to the receiving station based on the communication quality information received in the fifth step; and a seventh step in which the transmitting station transmits to the receiving station the result of allocation by the frequency allocation processing part.

By configuring as described above, the interfering signal when the white space is used is suppressed and the receiving quality can be improved, so that even if the downlink signal at the frequency of the white space falls in a low SIR environment, the downlink control signal can be received at the above frequency. Therefore, the above configuration enables to use the uplink at the above frequency while keeping the TDD system, and the effective use of the frequency of the whole system becomes feasible.

The present invention is suitable for a wireless system which is required to use a frequency efficiently to the maximum in an environment where "interfering and being interfered" with respect to another system which should coexist are different for every radio station. It can also be applied to the wireless system for which Half FDD operation is not specified.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A wireless communication system including a transmitting station and a receiving station to perform wireless communication mutually, and performing the wireless communication using a white space, wherein:

the receiving station includes:

a signal receiving part which receives a signal transmitted from the transmitting station at a first frequency of the white space;

an interference suppression part which performs processing to reduce the interference received with the signal received by the signal receiving part;

a communication quality estimation part which estimates communication quality of the communication using the first frequency based on the signal processed by the interference suppression part; and a communication quality information transmitting part which transmits to the transmitting station the communication quality information estimated by the communication quality estimation part; and the transmitting station has:

a communication quality information receiving part which receives the communication quality information from the receiving station;

a frequency allocation processing part which allocates the first frequency based on the communication quality information received by the communication quality information receiving part as a frequency at the time when a control signal is transmitted to the receiving station; and an allocated result transmitting part which transmits to the receiving station the result of allocation by the frequency allocation processing part.

2. The wireless communication system according to claim 1, wherein:

the communication quality estimation part estimates communication quality of each of the case in which the reduction processing is performed on the signal received at the first frequency by the interference suppression part and the case in which the reduction processing by the interference suppression part is not performed, and obtains finally the communication quality having high quality between the respective estimated communication quality; and the frequency allocation processing part decides a frequency at which data transmission is performed on the basis of the communication quality information received from the receiving station, and allocates the decided frequency as a frequency at the time of the data transmission to the receiving station.

3. The wireless communication system according to claim 1, wherein:

the transmitting station performs the wireless communication with one or plural of the receiving stations by an OFDMA (Orthogonal Frequency-Division Multiple Access) system;

the control information is modulated by a modulation method having a low required SINR (Signal-to-Noise Interference Ratio) in comparison with transmission of data from the transmitting station to the receiving station; and the frequency allocation processing part, when it is judged that the communication quality information received from the receiving station shows that there is interference at the first frequency and the receiving station receives the control signal only, allocates a frequency used at the time of transmission of the control signal to the receiving station to the first frequency and allocates the frequency used at the time of the data transmission to a second frequency different from the first frequency.

4. The wireless communication system according to claim 2, wherein:

the transmitting station performs the wireless communication with the plurality of receiving stations by the OFDMA system;

the transmitting station includes a signal transmitting part which simultaneously transmits the control signal and the data at a plurality of frequencies allocated by the frequency allocation processing part;

the frequency allocation processing part judges for each of the plurality of receiving stations that the communication quality indicated by the communication quality information is quality withstanding data communication performed by a high-order modulation method and decides the first frequency as a frequency at which data is transmitted from the transmitting station, and judges that the communication quality indicated by the communication quality information is quality nonwithstanding the data communication performed by the high-order modulation method and decides the second frequency other than the first frequency as a frequency at which data is transmitted; and the transmitting station transmits simultaneously the control signal and the data at the first frequency allocated by the frequency allocation processing part and the second frequency.

5. A receiving device of a receiving station for performing wireless communication with a transmitting station in a wireless communication system for performing wireless communication using a white space, including:

a signal receiving part for receiving a signal transmitted from the transmitting station at a first frequency of the white space;

an interference suppression part for performing processing to reduce the interference received with the signal received by the signal receiving part;

a communication quality estimation part for estimating communication quality of the communication using the first frequency based on the signal processed by the interference suppression part; and a communication quality information transmitting part for transmitting to the transmitting station the communication quality information estimated by the communication quality estimation part; and the first frequency is allocated based on the communication quality information from the receiving station as a frequency at the time of transmission of a control signal to the receiving station by the transmitting station to perform wireless communication with the transmitting station.

* * * * *